United States Patent
Kobayashi

(10) Patent No.: US 12,522,433 B2
(45) Date of Patent: Jan. 13, 2026

(54) OVERHEAD TRANSPORT VEHICLE

(71) Applicant: Murata Machinery, Ltd., Kyoto (JP)

(72) Inventor: Makoto Kobayashi, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 365 days.

(21) Appl. No.: 18/120,508

(22) Filed: Mar. 13, 2023

(65) Prior Publication Data
US 2023/0294917 A1    Sep. 21, 2023

(30) Foreign Application Priority Data
Mar. 17, 2022   (JP) .................... 2022-042698

(51) Int. Cl.
| | | |
|---|---|---|
| *B65G 1/00* | (2006.01) | |
| *B65G 1/04* | (2006.01) | |
| *B65G 47/90* | (2006.01) | |

(52) U.S. Cl.
CPC ........... *B65G 1/0457* (2013.01); *B65G 47/90* (2013.01); *B65G 2201/0235* (2013.01); *B65G 2203/044* (2013.01)

(58) Field of Classification Search
CPC .... B66C 1/30; B66C 1/10; B66C 5/06; B66C 17/06; B66C 17/12; B65H 1/0457; B65H 47/90; B65H 35/00; B65H 2203/044
See application file for complete search history.

(56) References Cited

U.S. PATENT DOCUMENTS

| | | | | |
|---|---|---|---|---|
| 2012/0000875 A1* | 1/2012 | Kawabata | ......... | H01L 21/67733 294/207 |
| 2019/0229003 A1* | 7/2019 | Kesil | ................ | H01L 21/67712 |
| 2022/0165598 A1* | 5/2022 | Cho | .................... | H01L 21/6773 |

FOREIGN PATENT DOCUMENTS

| | | | | | |
|---|---|---|---|---|---|
| CN | 112093661 | A | * | 12/2020 | |
| JP | H11-321635 | | | 11/1999 | |
| JP | 2016163001 | A | * | 9/2016 | |
| JP | 2018-039659 | | | 3/2018 | |
| JP | 2000-255237 | | | 9/2020 | |
| JP | 2020-169090 | | | 10/2020 | |
| JP | 2022187998 | A | * | 12/2022 | ............. B65G 17/20 |
| KR | 20160143383 | A | * | 12/2016 | ........... B65G 1/0457 |
| KR | 20190063951 | A | * | 6/2019 | ........... H01L 21/677 |
| KR | 20200082011 | A | * | 7/2020 | ........... B65G 1/0457 |
| KR | 20210023139 | A | * | 3/2021 | ........... B65G 1/0457 |
| KR | 2021055291 | A | * | 5/2021 | ........... B65G 1/0457 |
| KR | 20210055291 | A | * | 5/2021 | ........... B65G 1/0457 |
| KR | 102289021 | B1 | * | 8/2021 | ........... H01L 21/677 |
| KR | 20210106549 | A | * | 8/2021 | ............. B66C 17/06 |
| KR | 20220039367 | A | * | 3/2022 | ........... B65G 1/0457 |
| KR | 20220040554 | A | * | 3/2022 | ........... B65G 1/0457 |
| WO | WO-2018037762 | A1 | * | 3/2018 | ............... B61B 3/02 |

* cited by examiner

*Primary Examiner* — Emmanuel M Marcelo
(74) *Attorney, Agent, or Firm* — DLA Piper LLP (US)

(57) ABSTRACT

An overhead transport vehicle includes a gripper unit that grips an article, a hoist unit that lifts and lowers the gripper unit, and a hoist support unit supporting the hoist unit. The hoist unit is vertically movably mounted on the hoist support unit, and an anti-vibration member is interposed between the hoist support unit and the hoist unit.

5 Claims, 10 Drawing Sheets

Fig.1
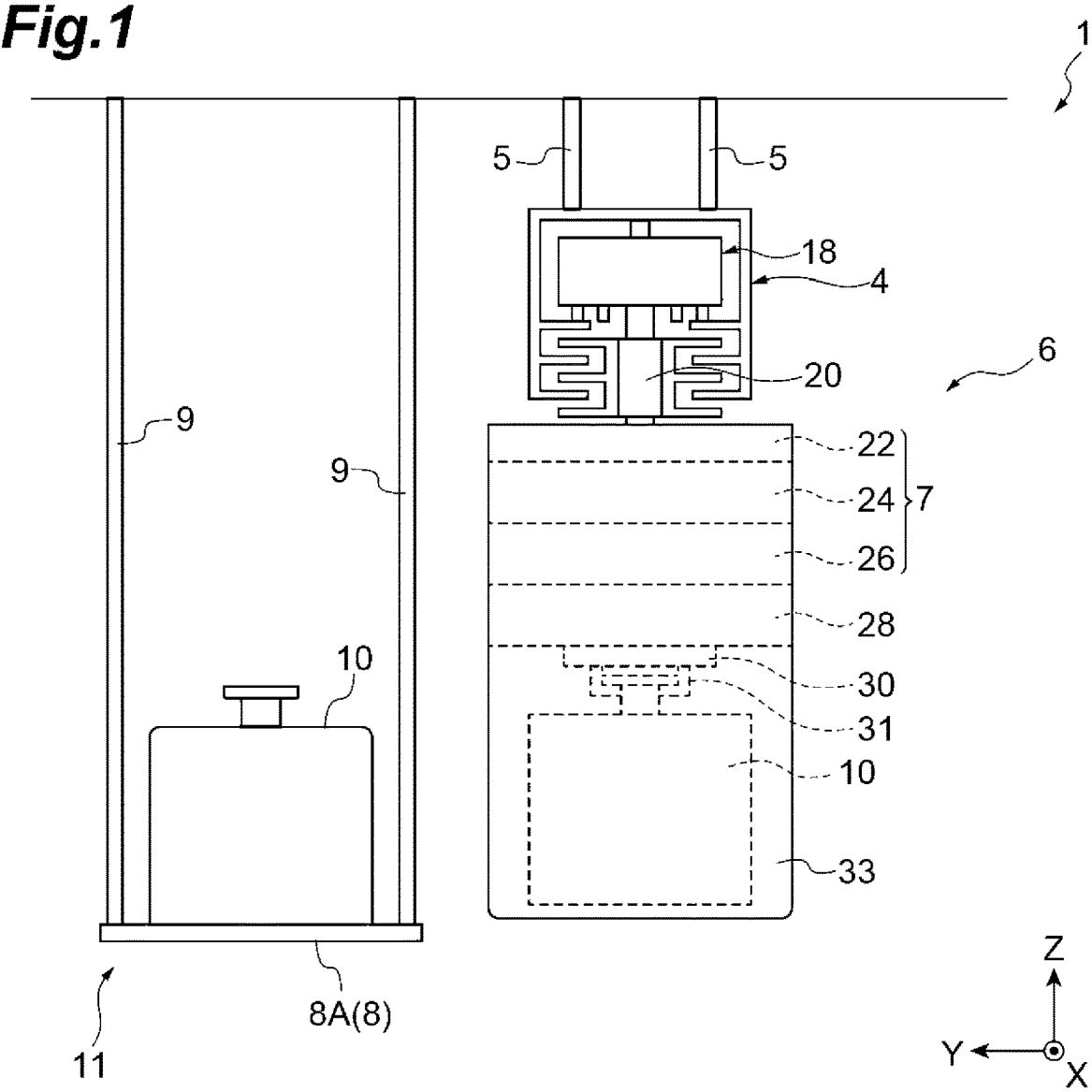
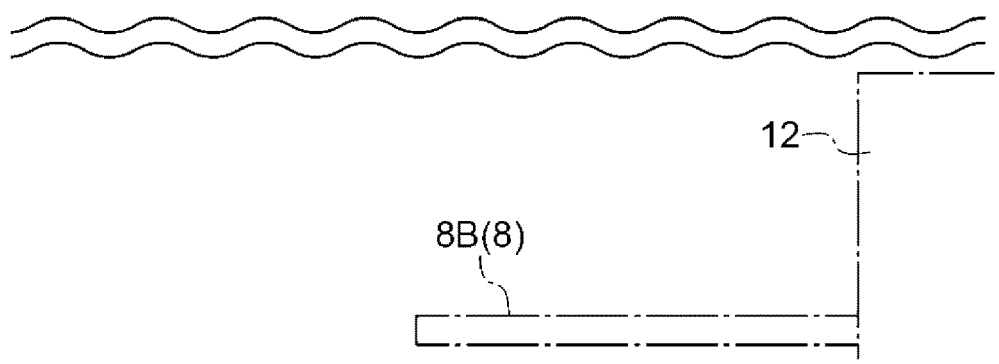

OVERHEAD TRANSPORT VEHICLE

TECHNICAL FIELD

This disclosure relates to an overhead transport vehicle.

BACKGROUND

Conventionally, article transport vehicles are known that travel on a rail suspended from and supported on a ceiling to transport a container (article) as dis-closed in Japanese Unexamined Patent Publication No. 2018-39659, for example. The transport vehicle includes a traveling unit that moves along a rail and a body unit suspended and supported by the traveling unit. The body unit includes a base coupled to the traveling unit, a support mechanism that supports a container, and a lifting operation mechanism that is supported by the base and that lifts and lowers the support mechanism. An elastic part is housed in the support mechanism and is used to absorb vibrations generated when the transport vehicle travels.

Overhead transport vehicles are required to reduce vibrations (anti-vibration). In a conventional system described above, the elastic part for absorbing vibrations is provided to the support mechanism that supports the container. When the support mechanism, that is, a gripper unit, is provided with an anti-vibration function, it tends to be difficult to stably provide an anti-vibration effect due to changes in the weight of the article. One of the reasons for this tendency is that the ratio of an amount of change in the weight of the article to the weight of the gripper unit provided with the anti-vibration function (the total weight of the gripper unit and the article when the gripper unit is gripping the article) is relatively large.

It could therefore be helpful to provide an overhead transport vehicle that can stably provide an anti-vibration effect.

SUMMARY

An overhead transport vehicle includes a gripper unit configured to grip an article, a hoist unit configured to lift and lower the gripper unit, and a hoist support unit supporting the hoist unit. The hoist unit is vertically movably mounted on the hoist support unit, and an anti-vibration member is interposed between the hoist support unit and the hoist unit.

The anti-vibration member interposed between the hoist support unit and the hoist unit absorb vibrations generated when the overhead transport vehicle travels. In one example, the anti-vibration function is provided to the hoist unit that is relatively heavy (having a large weight) compared with the article to be gripped by the gripper unit. Therefore, the anti-vibration effect is less likely to vary with changes in the weight of the article. Consequently, the anti-vibration effect can be stably provided.

The hoist unit may be vertically movably mounted on the hoist support unit with the parallel link. In one example, to exert the anti-vibration effect, the hoist unit vertically moves with respect to the hoist support unit. Therefore, the hoist unit can be prevented from tilting.

The parallel link may include a first end mounted on the hoist support unit with a first shaft and a second end mounted on the hoist unit with a second shaft, and a rubber bushing serving as the anti-vibration member may be provided in at least one of a space between the first end and the first shaft and a space between the second end and the second shaft. In one example, the parallel link is allowed to be displaced by deformation of the rubber bushing. The deformable and elastic rubber bushing can further enhance the anti-vibration effect in the overhead transport vehicle.

The overhead transport vehicle may further include a lateral movement mechanism configured to laterally move the hoist unit. The hoist unit may be equipped with a sensor configured to detect whether the article is placed on a storage shelf based on projected-light onto and received-light from a reflecting plate mounted on the storage shelf. The lateral movement mechanism may laterally move the hoist unit when the received-light from the reflecting plate is not detected. The hoist unit is vertically movable with respect to the hoist support unit. As a result, the optical axis of the sensor may possibly deviate. As described above, a lateral (horizontal) scanning operation using the sensor can be performed by laterally moving the hoist unit by the lateral movement unit. With this configuration, when received-light from the reflecting plate is not detected, it can be checked whether the article is actually placed on the storage shelf or the projected-light from the sensor does not reach the position of the reflecting plate (that is, the optical axis deviates). As a result, the presence or absence of the article on the storage shelf can be reliably detected.

We thus stably provide an anti-vibration effect.

BRIEF DESCRIPTION OF THE DRAWINGS

FIG. 1 is a schematic front view of an overhead transport vehicle according to an example.

DETAILED DESCRIPTION

Figure 2:
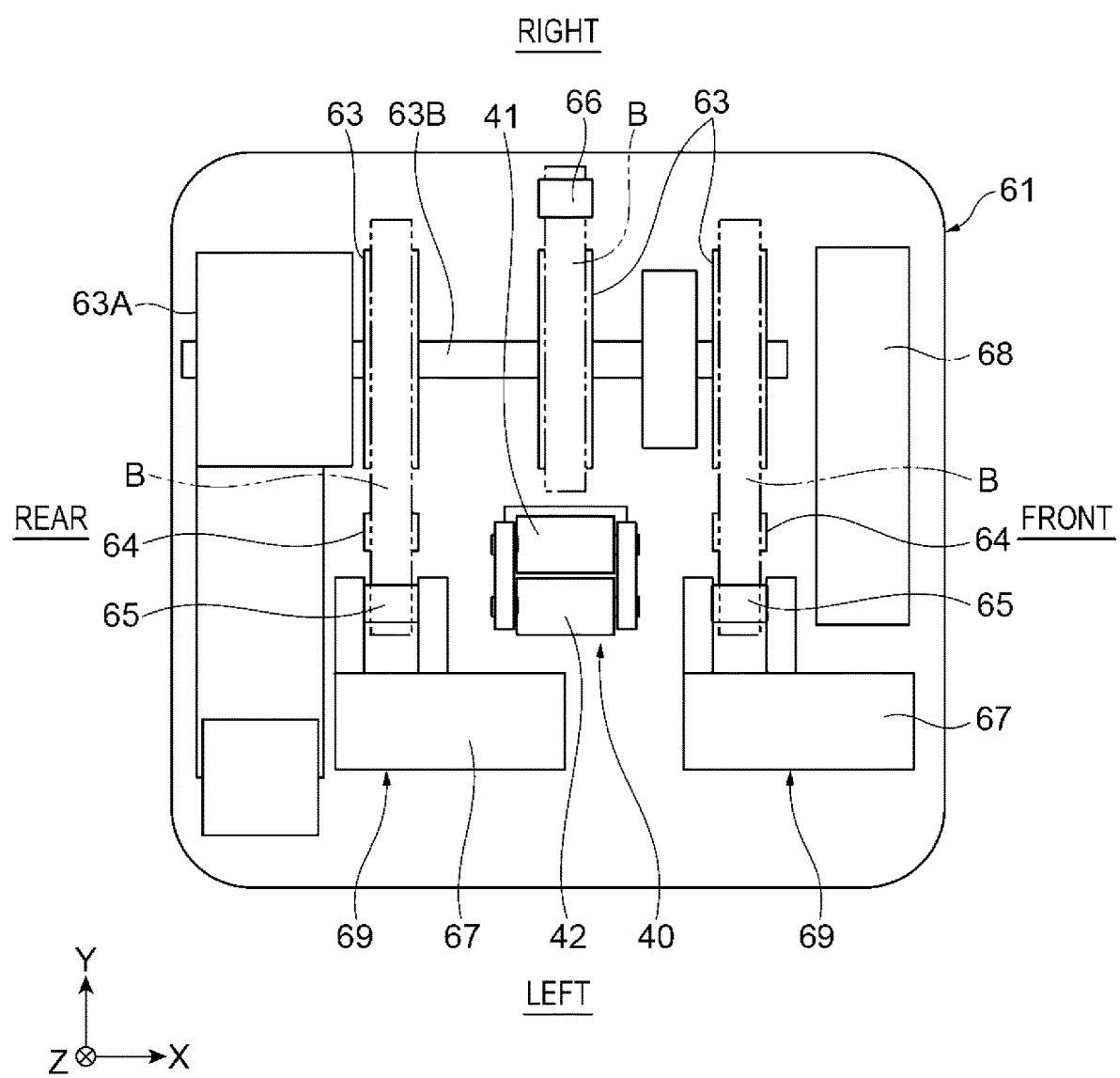
FIG. 2 is a bottom view of a hoist unit.

Examples are described below with reference to the drawings. In the description of the drawings, like elements are designated by like reference signs, and duplicate description is omitted.

As illustrated in FIG. 1, an overhead transport vehicle system 1 is a system that transports an article 10 using an overhead transport vehicle 6 that can move along a track 4. Examples of the article 10 include, but are not limited to, a FOUP serving as a container that houses a plurality of semiconductor wafers, a container that houses a glass substrate, a reticle pod, general parts and the like. The overhead transport vehicle 6 (a "transport vehicle 6") travels along the track 4 installed on a ceiling of a factory or the like. A storage shelf 11 including a placement unit 8 for storing the article 10 is installed on the side of the track 4. The article 10 transferred from the transport vehicle 6 is placed on the placement unit 8. The storage shelf 11 supports and stores the article 10 transferred from the transport vehicle 6.

The track 4 is installed near the ceiling in a space overhead of an operator, for example. The track 4 is suspended from the ceiling, for example. The track 4 is a predetermined traveling path for the transport vehicle 6 to travel. The track 4 is suspended and supported by a plurality of track pillars 5, for example. The storage shelf 11 is suspended and supported by a plurality of shelf pillars 9.

The transport vehicle 6 is an overhead traveling automated traveling vehicle, for example. The transport vehicle 6 travels along the track 4 to transport the article 10. The transport vehicle 6 travels along the track 4 in a +X-direction (predetermined traveling direction), for example. The transport vehicle 6 can transfer the article 10 to the placement unit 8 of the storage shelf 11. The transport vehicle 6 traveling on the track 4 transfers the article 10 along a Y-direction (lateral direction in a horizontal plane), for example. The Y-direction, which is the transfer direction of the article 10, is orthogonal to the X-direction, which is the traveling direction of the transport vehicle 6, in the horizontal plane, for example. The number of transport vehicles 6 included in the overhead transport vehicle system 1 is not limited to a particular number, and is two or more.

The transport vehicle 6 includes a traveling unit 18 and a power receiving communication unit 20. The traveling unit 18 causes the transport vehicle 6 to travel along the track 4. The power receiving communication unit 20 receives power from the track 4 by noncontact power supply, for example. The transport vehicle 6 communicates with a controller, which is not illustrated, using a communication line (feeder line) or the like of the track 4. Note that the transport vehicle 6 may communicate with the controller via a power supply line provided along the track 4. The transport vehicle 6 includes a body frame 22, a lateral transfer unit (lateral movement mechanism) 24, a θ drive 26, a hoist unit (lifting drive unit) 28, a lifting table (lifting unit) 30, and a body cover 33.

The lateral transfer unit 24 is mounted on the lower part of the body frame 22. The lateral transfer unit 24 collectively moves the θ drive 26, the hoist unit 28, and the lifting table 30 in the Y-direction. The lateral transfer unit 24 laterally moves the hoist unit 28, thereby transferring the article 10 to and from a buffer 8A (placement unit 8) of the storage shelf 11. The transport vehicle 6 laterally moves the hoist unit 28 and other components by the lateral transfer unit 24 and lifts and lowers the lifting table 30, thereby delivering and receiving the article 10 to and from the buffer 8A of the storage shelf 11. The lateral transfer unit 24 includes a drive motor, belts, gears, pulleys, and other components and moves the θ drive 26, the hoist unit 28, and the lifting table 30 in the Y-direction. The configuration of the lateral transfer unit 24 is not limited to the one described above, and other known configurations that allows lateral transfer of the article 10 may be employed.

The θ drive 26 is mounted on the lower part of the lateral transfer unit 24. The θ drive 26 holds the hoist unit 28 and the lifting table 30 and rotates the hoist unit 28 within a predetermined angular range in the horizontal plane.

The hoist unit 28 is mounted on the lower part of the θ drive 26. The hoist unit 28 lifts and lowers the lifting table 30 by winding or unwinding a suspending member such as a belt B. The following describes a schematic configuration of the hoist unit 28 with reference to FIG. 2. FIG. 2 is a bottom view of the hoist unit 28. The hoist unit 28 includes a body frame 61, three (a plurality of) winding drums 63, for example, first idler rollers 64, second idler rollers 65, a third idler roller 66, idler adjustment mechanisms 69 each including an actuator 67 and a swinging member, which is not illustrated, and three belts B. The suspending member may be a wire, a rope or the like.

The body frame 61 is suspended and supported by the θ drive 26 with an anti-vibration mechanism 40 described later. The body frame 61 has a rectangular shape extending in the X- and Y-directions, for example. The body frame 61 includes a base plate 61a on which the anti-vibration mechanism 40, which will be described later, is mounted. The body frame 61 supports the three (a plurality of) winding drums 63 and the first idler roller 64 with a support, which is not illustrated. One end of each belt B is connected to a gripper unit 31, and the other end thereof is connected to the corresponding winding drum 63. The three winding drums 63 are arrayed in the front-rear direction, and each of the three belts B is wound or unwound by drive of a drive motor 63A. Each winding drum 63 is rotatably mounted on the body frame 61. The drive motor 63A is a drive source for rotating each winding drum 63 and is fixed to the body frame 61. The three winding drums 63 are mounted on a common rotating shaft 63B and are driven together by the drive motor 63A. Alternatively, the three winding drums 63 may be coupled by an interlocking mechanism, which is not illustrated, and be driven together by the drive motor 63A.

In the hoist unit 28, two idler adjustment mechanisms 69 are provided for two pairs of the first idler roller 64 and the second idler roller 65 (that is, the two belts B on the left side) provided on the front and rear sides. The two idler adjustment mechanisms 69 are disposed on the left side in the body frame 61. The hoist unit 28 is provided with a servo amplifier 68 on the side (front side) opposite to the drive motor 63A.

Referring back to FIG. 1, the lifting table 30 is provided with a gripper unit 31 (also called a gripper or a chuck, for example) that grips the article 10. The gripper unit 31 can grip or release the article 10. The hoist unit 28 lifts and lowers the gripper unit 31. The body cover 33 is provided in pairs on the front and rear side of the transport vehicle 6 in the traveling direction, for example. The body cover 33 protrudes claws or the like, which are not illustrated, toward below the article 10 to prevent the article 10 from falling during transportation.

The placement unit 8 on which the article 10 is delivered to and received from the transport vehicle 6 includes the buffer 8A and a delivery port 8B, for example. The buffer 8A is a placement unit on which the article 10 is temporarily placed. The buffer 8A is suspended from the ceiling by the shelf pillars 9, for example. When the article 10 being transported by the transport vehicle 6 fails to be transferred onto the delivery port 8B for the reason that another article 10 is placed on the destination delivery port 8B, for example, the article 10 is temporarily placed on the buffer 8A. The delivery port 8B is a placement unit for delivering and receiving the article 10 to and from a semiconductor processing device 12 including cleaning equipment, deposition equipment, lithography equipment, etching equipment, thermal treatment equipment, and planarization equipment, for example. The processing device 12 is not limited to a particular one, and may be a device of various types.

The delivery port 8B in the example illustrated in FIG. 1 is located directly below the track 4, that is, the transport vehicle 6, however the delivery port 8B may be disposed on the side of the position of the track 4 (transport vehicle 6) in the Y-direction. In this example, the transport vehicle 6 moves the hoist unit 28 and other components by the lateral transfer unit 24 and lifts and lowers the lifting table 30 by the hoist unit 28, thereby delivering and receiving the article 10 to and from the delivery port 8B (placement unit 8).

The following describes the anti-vibration mechanism 40 included in the transport vehicle 6 according to this example with reference to FIGS. 2 to 6. When the transport vehicle 6 travels, vibrations may possibly occur due to various factors. The transport vehicle 6 includes the anti-vibration mechanism 40 as a mechanism for reducing vibrations that may possibly occur in the transport vehicle 6. As illustrated in FIG. 2, the anti-vibration mechanism 40 is disposed at substantially the center of the rectangular body frame 61. The space for installing the anti-vibration mechanism 40 is secured by adjustment in layout and/or design such as changing the position of the drive motor 63A and changing the number of belts B to three, for example. The anti-vibration mechanism 40 is disposed, for example, between the two belts B provided on the front and rear sides (between the two first idler rollers 64), and on the left side of another belt B at the center (the winding drum 63 at the center). The position of the drive motor 63A and/or the number of belts B may be different from those according to this example. The hoist unit 28 may be provided with four belts B. In this example, a first frame 41 of the anti-vibration mechanism 40, which will be described later, is disposed at substantially the center of the body frame 61 in bottom view.

Figure 3:
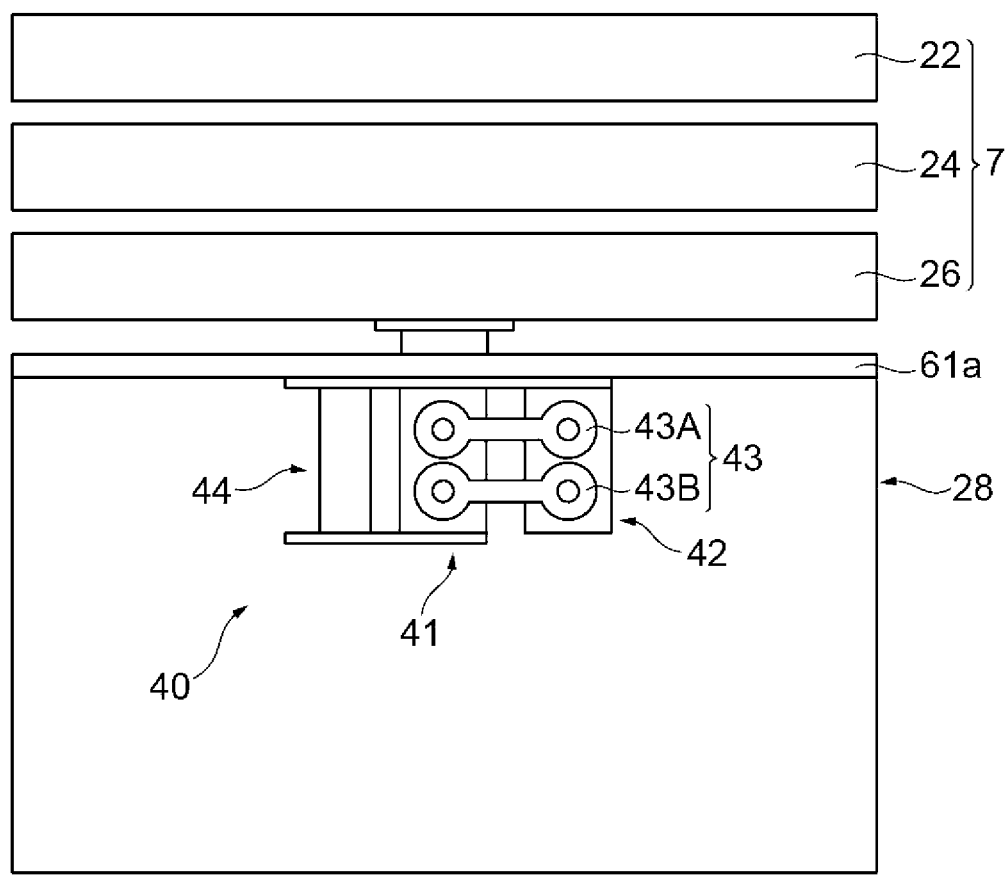
FIG. 3 is a front view schematically illustrating an anti-vibration mechanism provided to the hoist unit.

FIG. 3 is a front view schematically illustrating the anti-vibration mechanism 40 provided to the hoist unit 28. As illustrated in FIGS. 2 and 3, the anti-vibration mechanism 40 is mainly mounted on the hoist unit 28. Part of the anti-vibration mechanism 40 (first frame 41), however, is mounted on the θ drive 26. In this example, the body frame 22, the lateral transfer unit 24, and the θ drive 26 constitute a hoist support unit 7 that supports the hoist unit 28. The anti-vibration mechanism 40 is bridged between the hoist support unit 7 and the hoist unit 28. Conventionally, the hoist unit is rigidly mounted on the hoist support unit and fixed thereto. In the transport vehicle 6 according to this example, however, the hoist unit 28 is vertically movable with respect to the hoist support unit 7 due to the structure, which will be described later.

Figure 4:
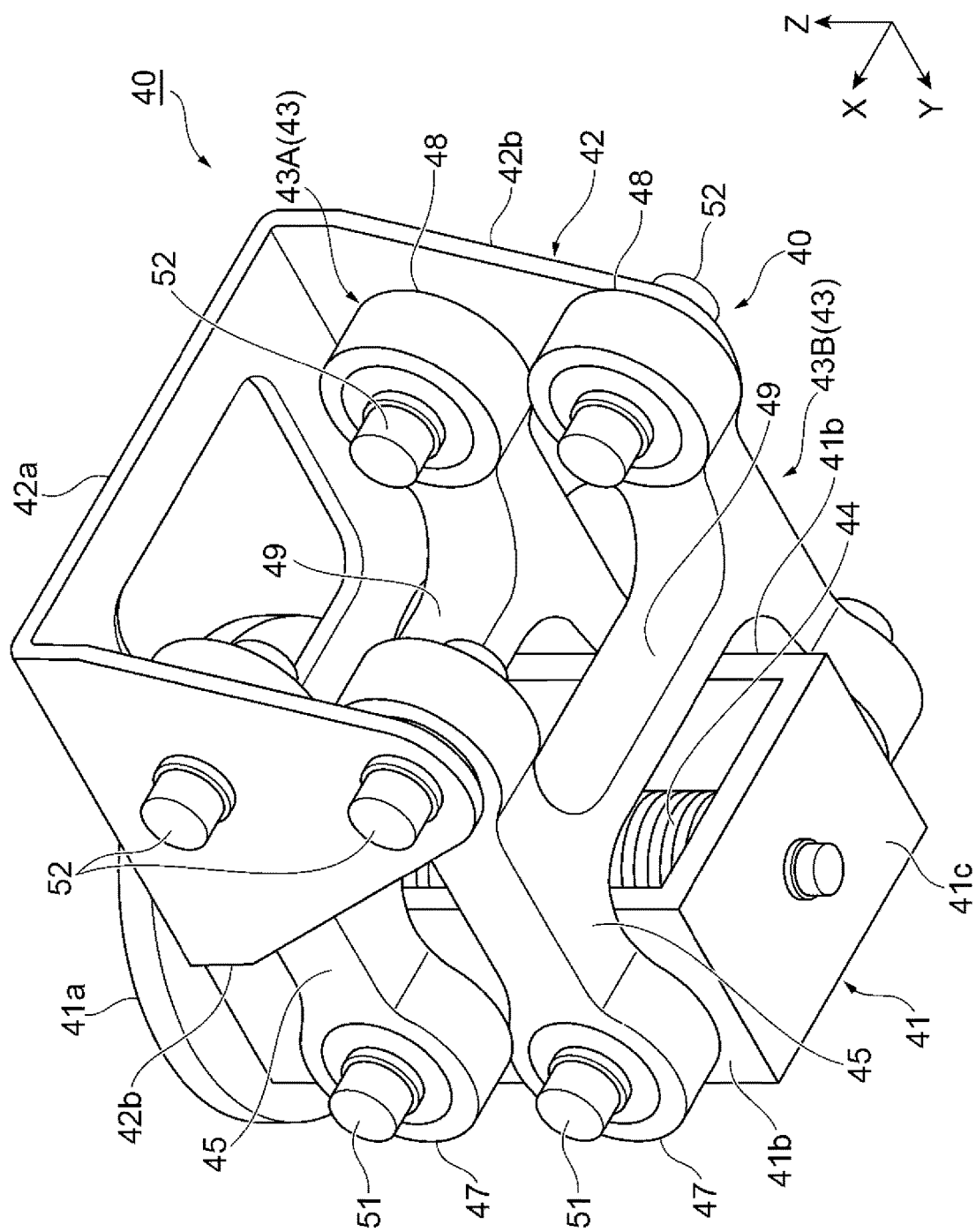
FIG. 4 is a perspective view of the anti-vibration mechanism in FIG. 2.
Figure 5:
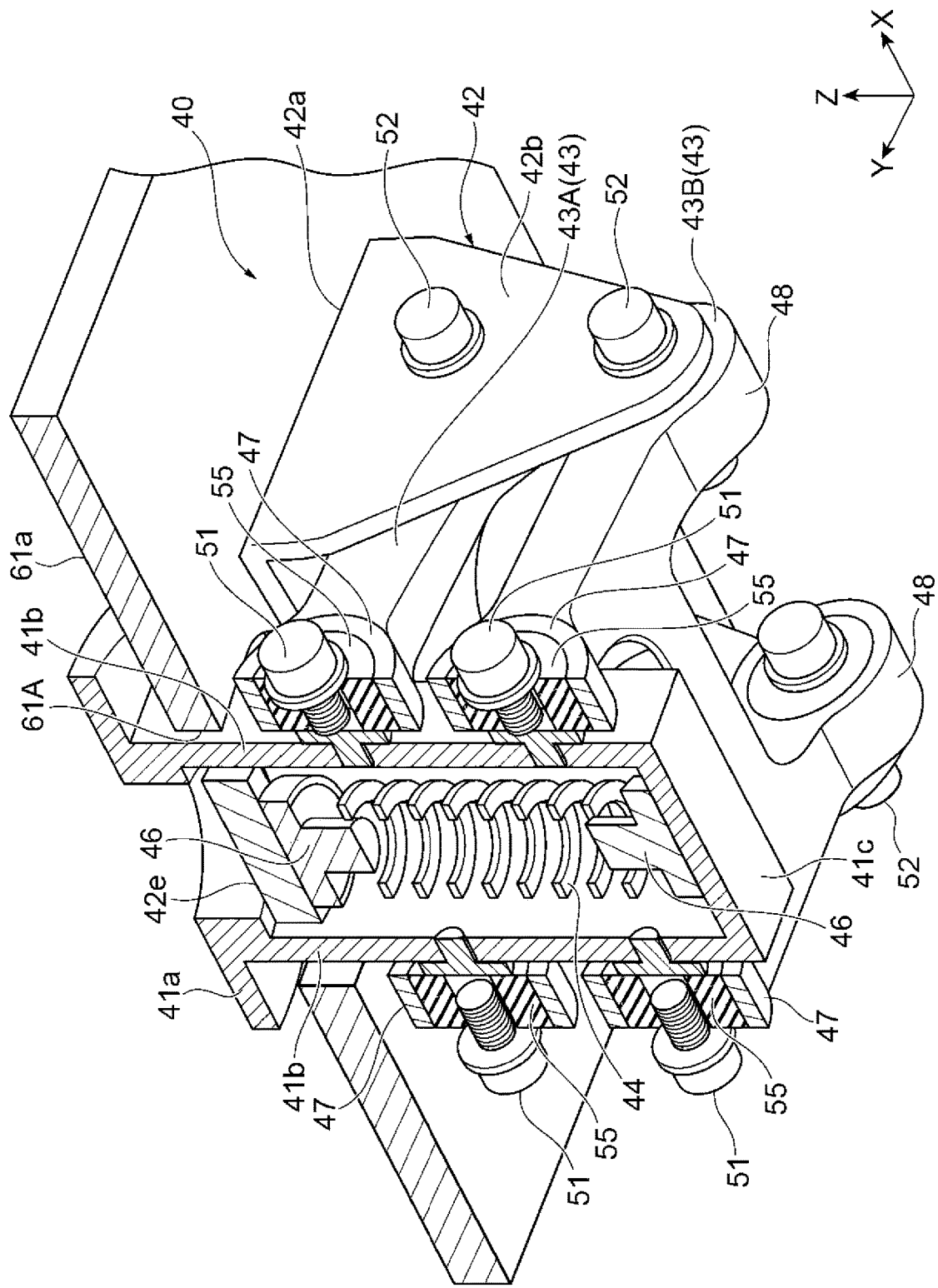
FIG. 5 is a perspective sectional view of the anti-vibration mechanism in FIG. 4 viewed from another angle.
Figure 6:
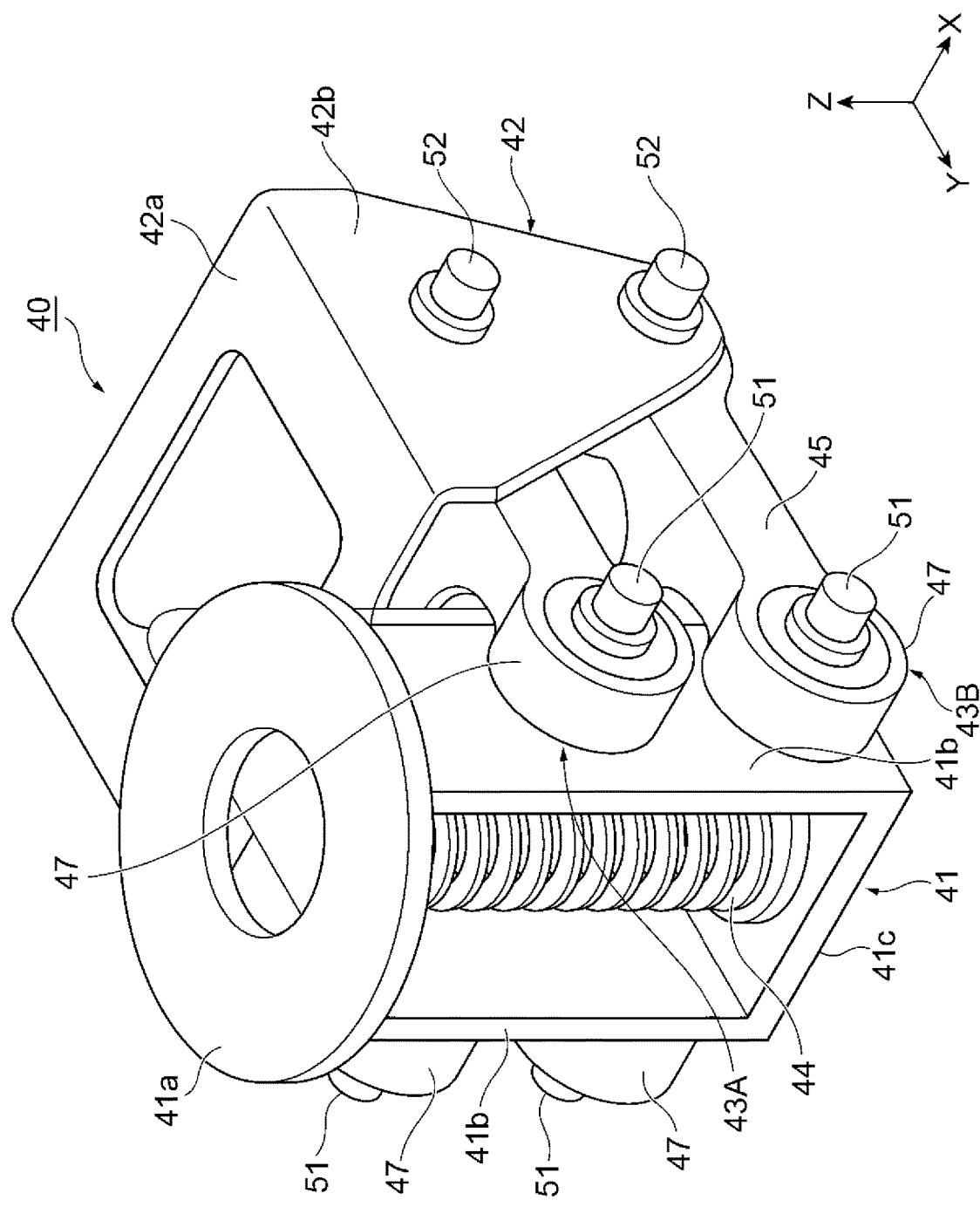
FIG. 6 is a perspective view of the configuration of the anti-vibration mechanism including a spring (anti-vibration member) and a parallel link.

As illustrated in FIGS. 4 to 6, the anti-vibration mechanism 40 includes a first frame 41, a second frame 42, a parallel link 43, and a spring 44. The first frame 41 is mounted on the θ drive 26 serving as part of the hoist support unit 7. The second frame 42 is mounted on the hoist unit 28. The parallel link 43 and the spring 44 are interposed between the first frame 41 and the second frame 42.

The first frame 41 is fixed to a support 26f (refer to FIG. 7A) of the θ drive 26, for example. The support 26f is formed on the lower surface of the θ drive 26 (lower surface of the hoist support unit 7), for example. The first frame 41 includes a flange 41a of a circular shape, a pair of side plates 41b of a rectangular shape, and a bottom plate 41c of a rectangular shape. The flange 41a is fixed to the support 26f using a fastening member or the like, which is not illustrated. The pair of side plates 41b is fixed to be continuously connected to the lower surface of the flange 41a. The bottom plate 41c couples the lower ends of the pair of side plates 41b. The pair of side plates 41b extends below the flange 41a and faces each other in a manner of being spaced apart in the X-direction, for example. The side plates 41b and the bottom plate 41c form a frame of U-shape, and the spring 44 disposed along a Z-direction is housed in the frame. The parts described above are integrated by welding or other processing, thereby forming the first frame 41.

The frame of U-shape is disposed in an opening 61A (see FIG. 5) formed in the base plate 61a of the body frame 61 to penetrate the base plate 61a. The frame has an open shape in the Y-direction. Therefore, the spring 44 is exposed when viewed from the Y-direction as illustrated in FIGS. 4 and 6.

The second frame 42 includes a top surface 42a of a rectangular flat shape and a pair of side surfaces 42b of an inverted triangular shape. The top surface 42a is fixed to the lower surface of the base plate 61a using a fastening member or the like, which is not illustrated. The pair of side surfaces 42b is formed to be continuously connected to both ends of the top surface 42a in the X-direction. The pair of side surfaces 42b extends below the top surface 42a and faces each other in a manner of being spaced apart in the X-direction, for example. The base of the side surface 42b is connected to the top surface 42a, and the width of the side surface 42b in the Y-direction tapers downward. As illustrated in FIG. 5, a spring holding piece 42e serving as part of the top surface 42a protrudes in the +Y-direction and enters into the first frame 41 (inside the frame of U-shape described above). The parts described above are integrated by welding or other processing, or one plate is folded, thereby forming the second frame 42.

The parallel link 43 is interposed between the first frame 41 and the second frame 42. The parallel link 43 includes an upper link member 43A and a lower link member 43B. The upper link member 43A and the lower link member 43B are identical members, for example, and are provided in parallel in a manner of being spaced apart in the Z-direction. The upper link member 43A and the lower link member 43B each include a pair of arms 45 extending in the Y-direction and a coupler 49 coupling the center portions of the arms 45, thereby forming an H-shape as a whole. The upper link member 43A and the lower link member 43B each include first ends 47 and second ends 48. The first ends 47 are mounted on the side plates 41b of the first frame 41 with two first shafts 51. The second ends 48 are mounted on the side surfaces 42b of the second frame 42 with two second shafts 52. The first end 47 and the second end 48 are formed at both ends of the arm 45 and each have an annular shape.

A pair of first ends 47 of the upper link member 43A is mounted on the side plates 41b with a pair of first shafts 51 provided on a common axis extending in the X-direction. A pair of second ends 48 of the upper link member 43A is mounted on the side surfaces 42b with a pair of second shafts 52 provided on a common axis extending in the X-direction. Similarly, a pair of first ends 47 of the lower link member 43B is mounted on the side plates 41b with a pair of first shafts 51 provided on a common axis extending in the X-direction. A pair of second ends 48 of the lower link member 43B is mounted on the side surfaces 42b with a pair of second shafts 52 provided on a common axis extending in the X-direction. The first shaft 51 for supporting the upper link member 43A and the first shaft 51 for supporting the lower link member 43B are vertically arranged at the position of the first frame 41. The second shaft 52 for supporting the upper link member 43A and the second shaft 52 for supporting the lower link member 43B are vertically arranged at the position of the second frame 42 (also refer to FIG. 7A). The four axes described above are parallel to each other.

The upper link member 43A and the lower link member 43B are supported by the side plates 41b serving as part of the first frame 41 with the first shafts 51 and by the side surfaces 42b serving as part of the second frame 42 with the second shafts 52. As a result, the second frame 42 and the hoist unit 28 are vertically movable with respect to the first frame 41, that is, the hoist support unit 7 (refer to FIGS. 7A and 7B). Technically, the second frame 42 moves in an arc trajectory with respect to the first frame 41, but the movable range of the second frame 42 is limited (which will be described later in greater detail). Therefore, the movement of the second frame 42 can be approximated to vertical movement (refer to FIGS. 7B and 8).

Thus, the hoist unit 28 is vertically movably mounted on the hoist support unit 7 with the parallel link 43.

As illustrated in FIG. 5, the spring (anti-vibration member) 44 serving as a compression coil spring, for example, is interposed between the bottom plate 41c in the first frame 41 and the spring holding piece 42e of the top surface 42a in the second frame 42. More precisely, cylindrical protrusions of spring supports 46 provided to be facing the upper surface of the bottom plate 41c and the lower surface of the spring holding piece 42e are inserted into the spring 44 from the upper and the lower ends of the spring 44, whereby the spring 44 is held.

In addition, rubber bushings 55 of a cylindrical shape are provided around each shaft between the first end 47 of the parallel link 43 and the first shaft 51 and between the second end 48 and the second shaft 52. The total number of the rubber bushings 55 is eight. The rubber bushing 55 is a kind of anti-vibration member provided to the anti-vibration mechanism 40. The method of attaching the rubber bushing 55 is not particularly limited, and known methods can be employed. For example, the outer ring portion of the rubber bushing 55 may be press-fitted into the first end 47 and the second end 48, and the first shaft 51 and the second shaft 52 may be press-fitted into the inner ring portion of the rubber bushing 55. In addition to press-fitting, fixing by fastening may also be employed. Although not illustrated in the figure, the outer and the inner ring portions of the rubber bushing 55 are made of metal, for example, and the rubber bushing 55 includes a bushing body of a cylindrical shape made of rubber between the outer and the inner ring portions. The bushing body is fixed to the outer and the inner ring portions, and deformation of the bushing body can displace the first end 47 and the second end 48 with respect to the respective shaft bodies.

The rubber bushings 55 are provided to the joints of the parallel link 43. In other words, the rubber bushings 55 are disposed on the vibration transmission path in the anti-vibration mechanism 40. These rubber bushings 55 can provide the anti-vibration effect in the X- and Y-directions.

In the anti-vibration mechanism 40, the first frame 41 is fixed to the θ drive 26 (hoist support unit 7), and thus integrated with the θ drive 26. The second frame 42 is fixed to the hoist unit 28, and thus integrated with the hoist unit 28. Therefore, in the transport vehicle 6, the anti-vibration member including the spring 44 and the rubber bushings 55 is interposed between the hoist support unit 7 and the hoist unit 28.

In the transport vehicle 6, the spring 44 and the rubber bushings 55 interposed between the hoist support unit 7 and the hoist unit 28 absorb vibrations generated when the transport vehicle 6 travels. In this example, the anti-vibration function is provided to the hoist unit 28 that is relatively heavier (having a large weight) compared to the article 10 to be gripped by the gripper unit 31. Therefore, the anti-vibration effect is less likely to vary with changes in the weight of the article 10. Consequently, the anti-vibration effect can be stably provided. This configuration has a more advantageous effect in terms of the anti-vibration effect than when the anti-vibration function is provided to the gripper unit like the system described in Japanese Unexamined Patent Publication No. 2018-39659 described above.

Figure 7A:
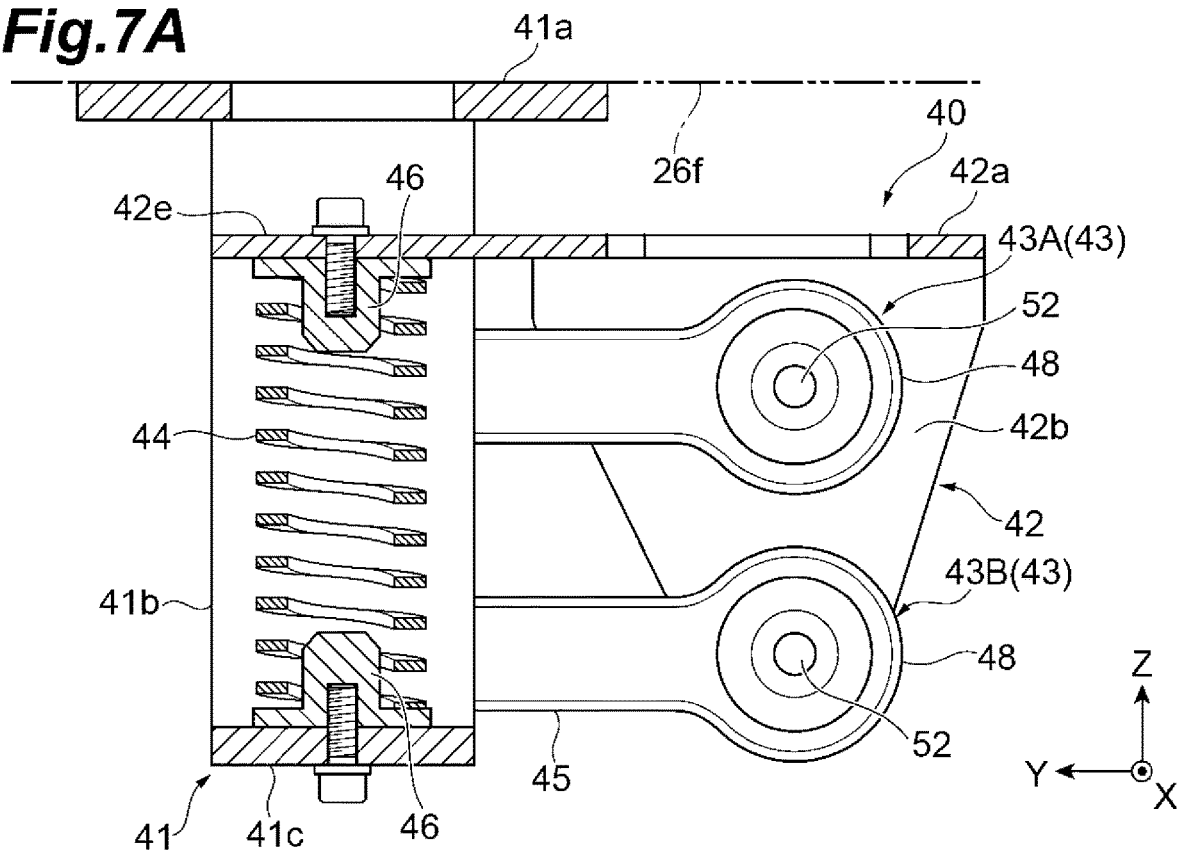
FIG. 7A is a front sectional view of the anti-vibration mechanism in a normal state.
Figure 7B:
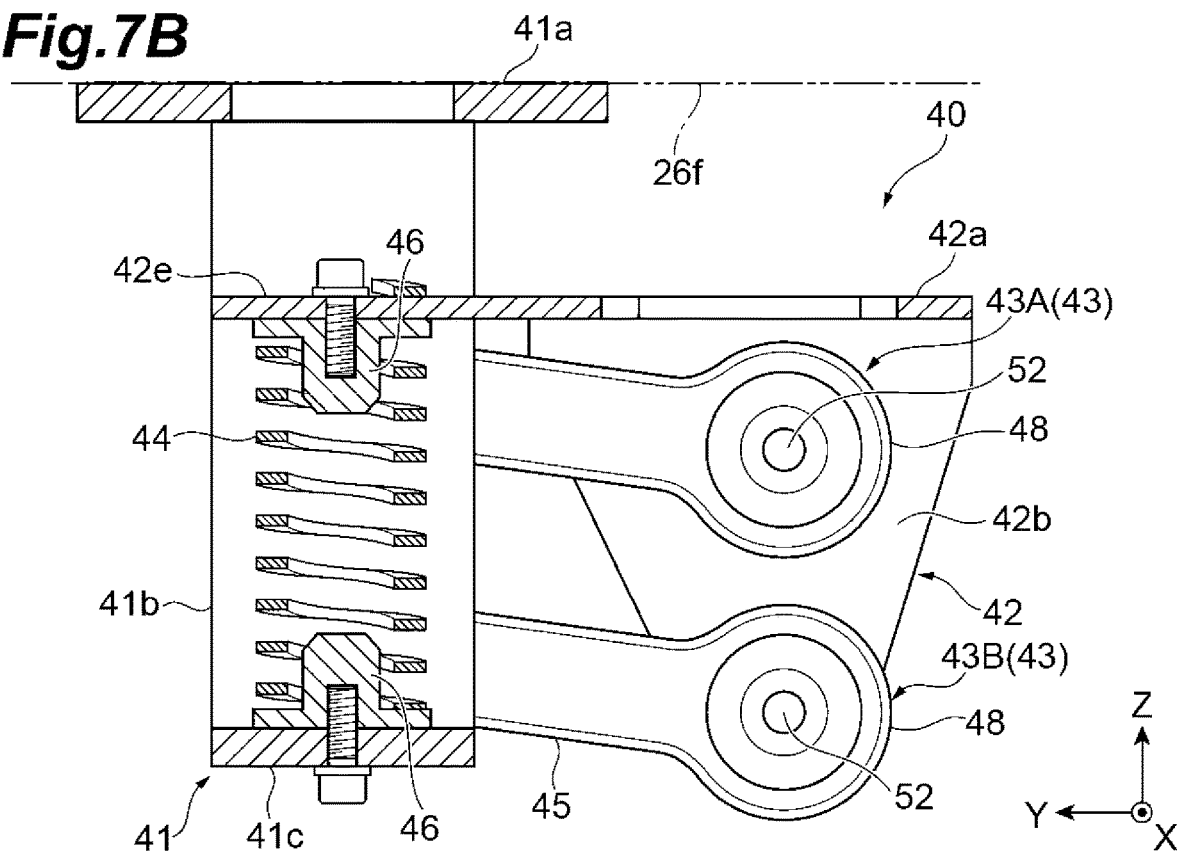
FIG. 7B is a front sectional view of the anti-vibration mechanism when a load or an impact is applied.
Figure 8:
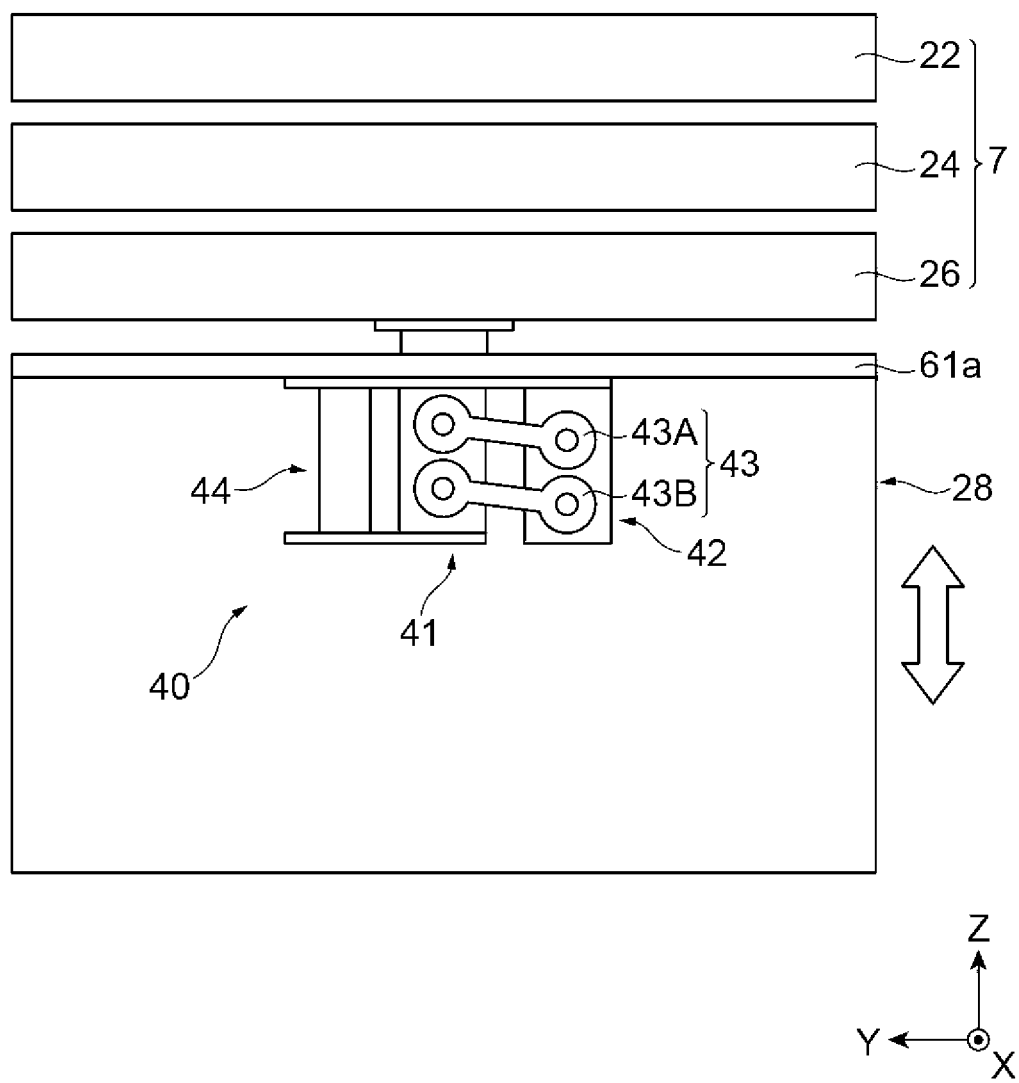
FIG. 8 is a front view schematically illustrating the movable direction of the hoist unit by the anti-vibration mechanism including the parallel link.

The hoist unit 28 is vertically movably mounted on the hoist support unit 7 with the parallel link 43. To exert the anti-vibration effect, the hoist unit 28 vertically moves with respect to the hoist support unit 7 (see FIGS. 7A and 7B). As illustrated in FIG. 7A, in the normal position of the hoist unit 28, the spring 44 is compressed by a predetermined length corresponding to the load applied to the hoist unit 28 (load including the article 10 when the gripper unit 31 is gripping the article 10), and the second frame 42 is positioned at a certain height. As illustrated in FIG. 7B, when a further load is applied to the hoist unit 28 or an impact occurs in the transport vehicle 6, the spring 44 is further compressed, and the second frame 42 lowers to a lowered position. As illustrated in FIGS. 7B and 8, the second frame 42 in the lowered position remains in a horizontal posture. Therefore, the hoist unit 28 can be prevented from tilting.

The parallel link 43 is allowed to be displaced by deformation of the rubber bushing 55 provided around each of the first shafts 51 and the second shafts 52 in the parallel link 43. The rubber bushing 55 that is deformable and elastic can further enhance the anti-vibration effect in the transport vehicle 6.

While an example has been described, this disclosure is not limited to the example described above.

Figure 9:
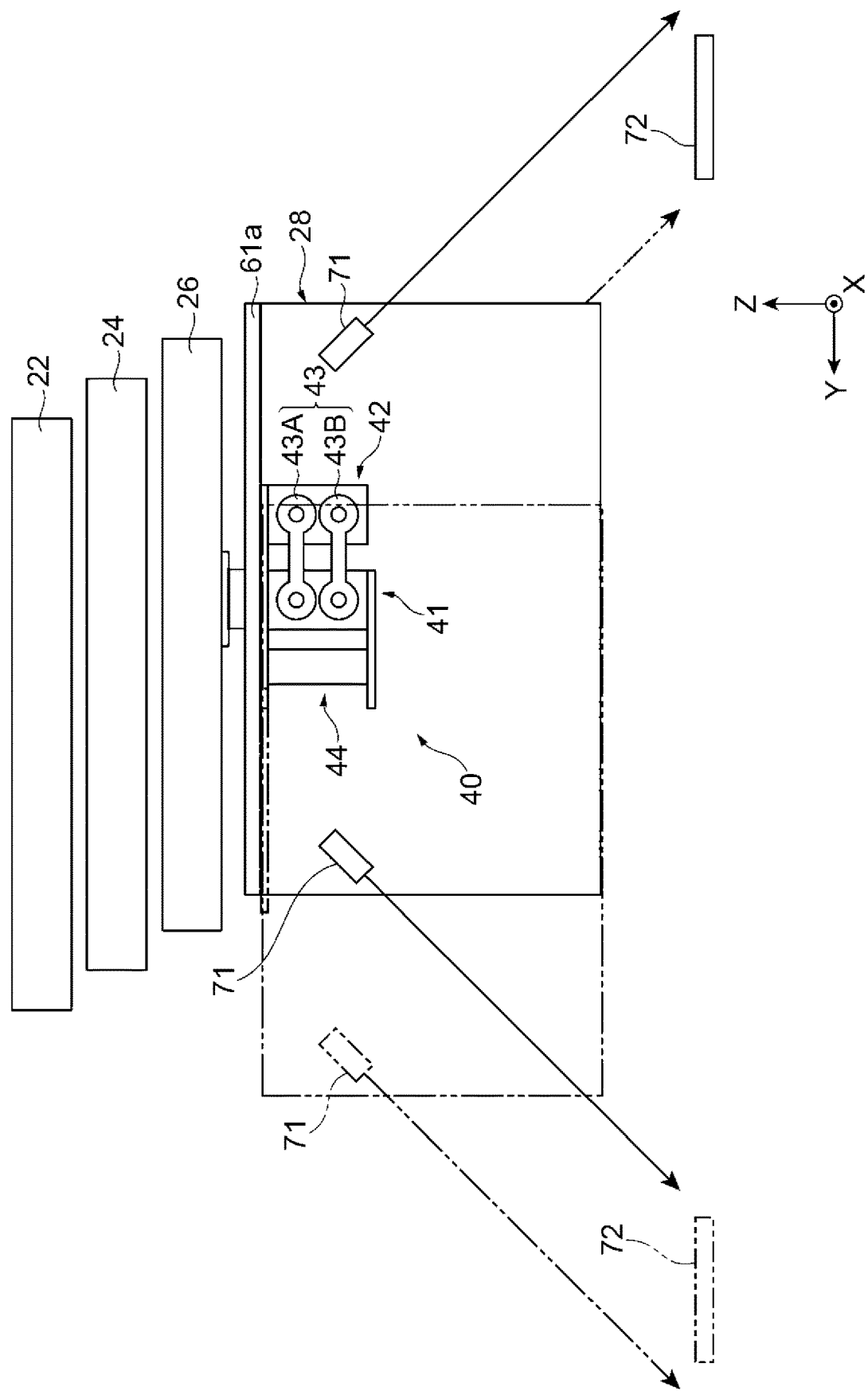
FIG. 9 is a view showing an example where the hoist unit is provided with loading sensors.

For example, the transport vehicle 6 may be provided with a configuration related to various sensors corresponding to the hoist unit 28 that vertically moves. The transport vehicle 6 includes the lateral transfer unit 24 configured to laterally move the hoist unit 28, for example. As illustrated in FIG. 9, a reflecting plate 72 is mounted on the placement unit 8 of the storage shelf 11 (see FIG. 1). The hoist unit 28 is equipped with loading sensors 71 that detect whether the article 10 is placed on the storage shelf 11 based on projected-light onto and received-light from the reflecting plate 72. Normally, if received-light from the reflecting plate 72 is detected, a controller, which is not illustrated, determines that the article 10 is not placed (absent), and if received-light from the reflecting plate 72 is not detected, the controller determines that the article 10 is placed (present). However, as illustrated in FIG. 9, when received-light from the reflecting plate 72 is not detected, the lateral transfer unit 24 may laterally move the hoist unit 28. With this configuration, the loading sensor 71 can perform a scanning operation while maintaining the state of projecting light in a predetermined direction.

In the transport vehicle 6, the hoist unit 28 can be vertically displaced with respect to the hoist support unit 7. As a result, the optical axis of the loading sensor 71 may possibly deviate. As described above, laterally moving the hoist unit 28 by the lateral transfer unit 24 enables a lateral (horizontal) scanning operation using the loading sensor 71. With this configuration, when received-light from the reflecting plate 72 is not detected, it is possible to check whether the article 10 is actually placed on the storage shelf 11 or the projected-light from the loading sensor 71 does not reach the position of the reflecting plate 72 (that is, the optical axis deviates). As a result, the presence or absence of the article 10 on the storage shelf 11 can be reliably detected.

Figure 10:
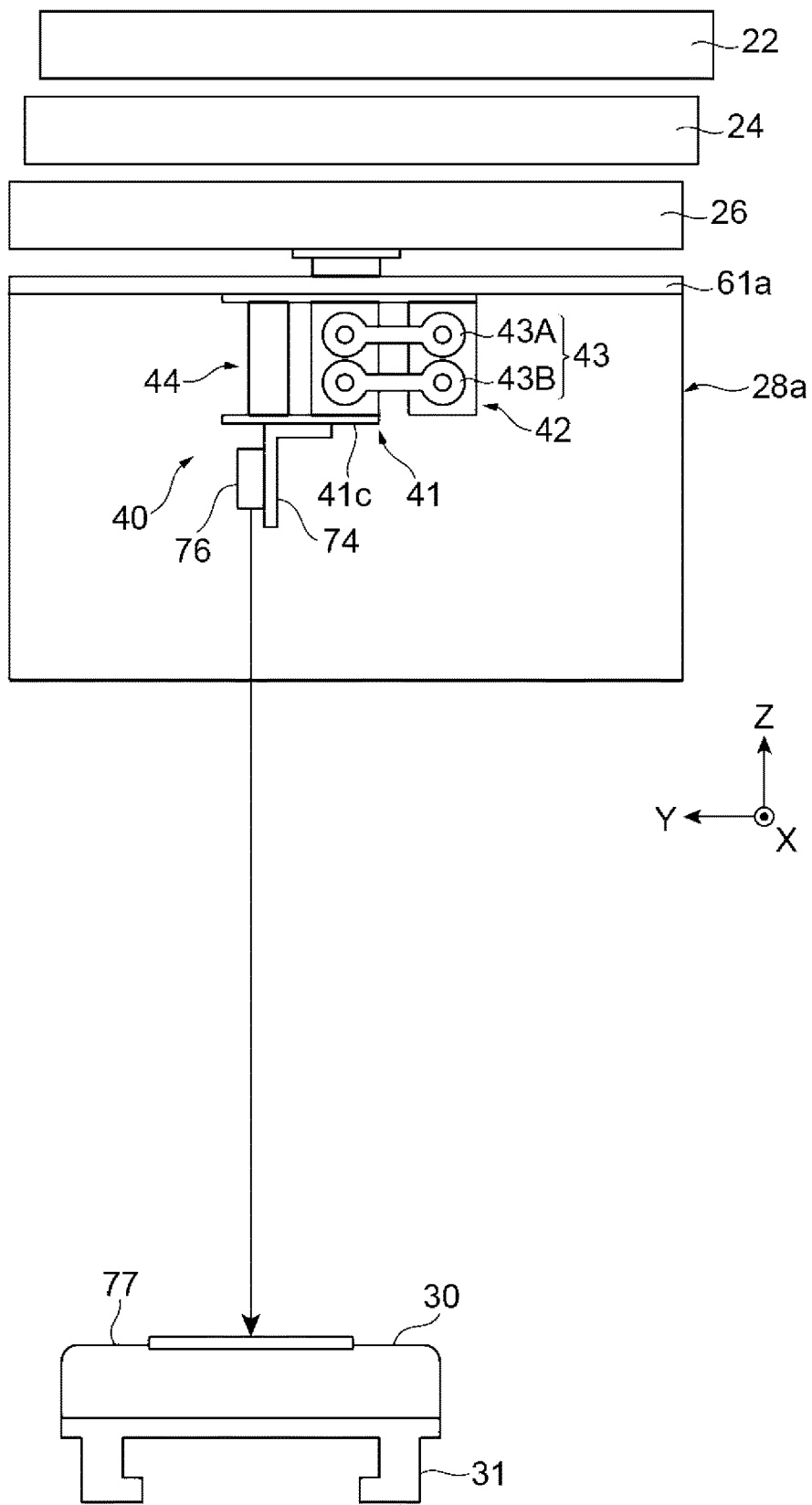
FIG. 10 is a view showing an example where the hoist unit is provided with a swing detection sensor.

As illustrated in FIG. 10, a configuration can also be devised for a swing detection sensor 76. In other words, in a conventional configuration, a swing detection sensor is provided to the body frame 61 or other part of the hoist unit 28, however the swing detection sensor 76 may be fixed to a bracket 74 fixed to the bottom plate 41c or other part of the first frame 41. The first frame 41 is fixed to the θ drive 26 serving as part of the hoist support unit 7. This configuration enables accurate detection of a swing based on projected-light onto and received-light from a reflecting plate 77 without being affected by the movement of the hoist unit 28.

In addition, the configuration of the anti-vibration mechanism including the anti-vibration member is not limited to the example described above. The rubber bushings, for example, may be provided to only one of the first shafts and the second shafts. The rubber bushings may be omitted. Instead of the spring, other elastic members may be used as the anti-vibration member. Examples of the other elastic members (anti-vibration members) include rubber members, silicone gel, and the like. The anti-vibration member may be other than an elastic member.

A coupling mechanism other than the parallel link may be used. Other known configurations may be used as long as the coupling mechanism allows the hoist unit to be displaced vertically or in other directions. An elastic member, a damper or the like may be provided between the hoist support unit and the hoist unit.

The configuration of the hoist support unit 7 is not limited to the configuration according to the example described above. At least one of the lateral transfer unit 24 and the θ drive 26 may be omitted.

Various functions and configurations described with reference to FIGS. 9 and 10 are not necessarily employed. The scanning operation by the loading sensor 71 may be omitted. The swing detection sensor 76 may be provided to the body frame 61.

What is claimed is:

1. An overhead transport vehicle comprising:
   a gripper unit configured to grip an article;
   a hoist unit configured to lift and lower the gripper unit; and
   a hoist support unit supporting the hoist unit, wherein
   the hoist unit is vertically movably mounted on the hoist support unit, and
   an anti-vibration member is interposed between the hoist support unit and the hoist unit, wherein the hoist unit is vertically movably mounted on the hoist support unit with a parallel link interposed between the hoist unit and the hoist support unit.

2. The overhead transport vehicle according to claim 1, wherein
   the parallel link includes a first end mounted on the hoist support unit with a first shaft and a second end mounted on the hoist unit with a second shaft, and
   a rubber bushing serving as the anti-vibration member is provided in at least one of a space between the first end and the first shaft and a space between the second end and the second shaft.

3. The overhead transport vehicle according to claim 2, further comprising:
   a lateral movement mechanism configured to laterally move the hoist unit, wherein the hoist unit is equipped with a sensor configured to detect whether the article is placed on a storage shelf based on projected-light onto and received-light from a reflecting plate mounted on the storage shelf, and
   the lateral movement mechanism laterally moves the hoist unit when the received-light from the reflecting plate is not detected.

4. The overhead transport vehicle according to claim 1, further comprising:
   a lateral movement mechanism configured to laterally move the hoist unit, wherein
   the hoist unit is equipped with a sensor configured to detect whether the article is placed on a storage shelf based on projected-light onto and received-light from a reflecting plate mounted on the storage shelf, and
   the lateral movement mechanism laterally moves the hoist unit when the received-light from the reflecting plate is not detected.

5. An overhead transport vehicle comprising:
   a gripper unit configured to grip an article;
   a hoist unit configured to lift and lower the gripper unit; and
   a hoist support unit supporting the hoist unit, wherein
   the hoist unit is vertically movably mounted on the hoist support unit, and
   an anti-vibration member is interposed between the hoist support unit and the hoist unit;
   a lateral movement mechanism configured to laterally move the hoist unit, wherein
   the hoist unit is equipped with a sensor configured to detect whether the article is placed on a storage shelf based on projected-light onto and received-light from a reflecting plate mounted on the storage shelf, and
   the lateral movement mechanism laterally moves the hoist unit when the received-light from the reflecting plate is not detected.

* * * * *